United States Patent [19]

Willinger

[11] 4,148,730
[45] Apr. 10, 1979

[54] UNDERGRAVEL AQUARIUM FILTER

[75] Inventor: Allan H. Willinger, New York, N.Y.

[73] Assignee: Willinger Bros., Inc., New York, N.Y.

[21] Appl. No.: 793,252

[22] Filed: May 3, 1977

[51] Int. Cl.² ............................................. E04H 3/20
[52] U.S. Cl. ......................................... 210/169; 119/5
[58] Field of Search ......................... 210/169; 119/3, 5

[56] References Cited
U.S. PATENT DOCUMENTS

| | | | |
|---|---|---|---|
| 2,744,065 | 5/1956 | Lacey | 210/169 |
| 2,871,820 | 2/1959 | Haydon | 119/5 |
| 3,333,701 | 8/1967 | Scafuro | 210/169 |
| 3,472,381 | 10/1969 | Halpert | 210/169 |
| 3,516,544 | 6/1970 | Seshultz | 210/169 |
| 3,720,318 | 3/1973 | Cohen | 210/169 |
| 3,720,319 | 3/1973 | White | 210/169 |
| 3,827,560 | 8/1974 | Mortm | 210/169 |
| 4,035,298 | 7/1977 | Clote et al. | 210/169 |

Primary Examiner—Theodore A. Granger
Attorney, Agent, or Firm—Friedman, Goodman and Teitelbaum

[57] ABSTRACT

An undergravel aquarium filter having a housing assembly which can be positioned on an aquarium tank floor underneath the gravel bed and forms a water compartment between the housing and the floor. The housing assembly includes separable inner and outer sections in fluid flow communication with each other. An upwardly extending enclosure formed on the inner section includes air inlet and outlet members. An air stream supply is provided through the inlet member to a mixing chamber within the enclosure, thereby causing water from the tank to enter the water compartment after passing through the gravel bed, and therefrom the water and air can egress through the outlet member. Seats formed in the housing assembly can accommodate the feet supporting an air pump, whereby the air pump can be easily positioned on the housing assembly during packaging. A groove formed between the inner and outer sections accommodates passage therethrough of the pump line cord during storage of the line cord within the inner section. An air hose can be stored in the outer section. Extension funnels for the outlet member can be stored between the enclosure and the air pump. This convenient integration of the parts of the filter provides a compact assembly for packaging.

14 Claims, 8 Drawing Figures

UNDERGRAVEL AQUARIUM FILTER

BACKGROUND OF THE INVENTION

This invention relates to aquarium filters and more particularly to an undergravel aquarium aerating and filtering system for aquarium tanks.

There are presently available numerous types and forms of aquarium filters. Most of these simultaneously provide for filtering of the decontaminated water from the fish tank, and at the same time provide the necessary aeration of the water to ensure an adequate supply of dissolved air into the water. Most of the aquarium filters include air pumps which bubble air into a housing and permit the air to pass out of outlet pipes. Water from the tank is sucked into the enclosure and filtered, and the decontaminated water is caused to flow out of the outlet tube together with the air, thereby providing an airlift of clean water which is filtered and aerated.

One type of aquarium filter devices is the bottom aquarium filter which is placed over the gravel near the bottom of the tank. These filters use filtering material directly in the filter housing, such as charcoal, fiberglass, etc. The decontaminated water enters into the filter housing and passes through the filter material within the housing. The decontaminated water is then air lifted out of the housing by means of the flow of air. Another type of aquarium filter is known as the undergravel filter device. In such filters, the filter is placed under the gravel bed at the bottom of the aquarium tank. A compartment is formed between the housing and the bottom of the aquarium tank. Slots are formed in the housing which are small enough to permit the water to pass into the enclosure while preventing the gravel from passing through these openings. Air is pumped to the enclosure and is permitted to leave through an outlet pipe. As the air leaves, it causes a suction whereby water is drawn from the tank through the gravel into the enclosure, and passes out of the outlet means together with the air.

In the latter type of filters, the aquarium gravel bed serves as the filter material and bacteria can convert the sewage and other decontamination waste products into non-toxic matter largely in the form of gaseous matter. Alternately, as the waste accumulates in greater amounts than can be converted, the gravel can be taken out, washed, and cleaned and then returned back to again form the gravel bed over the filter.

However, existing undergravel filter devices have not adequately solved problems which are peculiarly inherent to such undergravel filter devices. By way of example, one problem existing with undergravel filter devices concerns their size. When using a bottom aquarium filter which is placed on top of the gravel, this filter can be placed in any portion of the aquarium tank which has adequate size to accommodate the filter housing. For example, in bowl shaped aquarium tanks, there exists a wider portion near the center of the tank. The bottom aquarium filter can therefore be placed at this wider portion in order to accommodate a large size filter. Additionally, since the bottom aquarium filter can be moved about and placed at any appropriate place in the tank, various shapes of filters can be utilized to accommodate any particular shape of the aquarium tank. In narrow tall tanks, a bottom aquarium filter can be utilized which is narrow and tall and because of its height will provide sufficient filtering capacity. If the aquarium tank is shallow and wide, a flattened type of bottom aquarium filter can be placed on top of the gravel whose width will be large enough to provide the needed filtering capacity.

However, in undergravel type filters, there exits a space limitation. Since this filter must be placed under the gravel, the height of the filter housing is generally limited by the thickness of the gravel bed. This thickness is generally small for all types of aquarium tanks. To provide enough filtering capacity, the area must therefore be made wide. A given filter housing may be adequate for large aquarium tanks, but its size may be too large for smaller tanks. Alternately, if only a small sized undergravel filter is manufactured, there will be insufficient filtering capacity for a large size tank. Accordingly, one problem that has not been heretofore faced is to provide an undergravel filter device which can be useful for various sized aquarium tanks, both large and small.

Another problem unique to the undergravel filter device concerns the flow of air into the water compartment. In such filters, the water compartment is formed between the tank floor and the top plate of the filter housing. It is into this water compartment that the tank water must enter. The air must then be pumped into this compartment. Furthermore, the air must be provided in appropriate supply and in proper direction to cause sufficient suction throughout this water compartment to thereby permit filtering of the water throughout the entire surface area of the filter housing. Some prior art devices have attempted to direct the ingressed air only beneath the gravel and into the water compartment. However, the air will then have a tendency not to provide sufficient suction within the entire area of the filter. Other prior devices have formed a vertical tube directly over the water compartment having adjacent inlet and egress means. However, the air will then immediately return up the outlet pipe without providing sufficient opportunity to bring therewith the filtered water from the water compartment. Accordingly, such undergravel filter devices have generally not been as efficient or satisfactory as bottom aquarium filters which, as set forth above, are placed on top of the gravel bed.

A further problem existing with undergravel filter devices concerns the packaging of the equipment. The equipment of a filter generally includes the filter housing, the air pump, the air hose, the line cord connected to the air pump, and any other pipes needed for inlet and outlet of the air and water. With bottom aquarium filters placed on top of the gravel, the filter housing is of relatively large shape, typically of a rectangular or triangular configuration, and most of the parts of the complete filter system can be placed directly within the filter housing. However, the undergravel filter device has a filter housing which is of comparatively shallow depth and relatively wide area and accordingly makes it inconvenient to provide a compact package of all the components necessary for a complete aquarium filter and aerating system.

SUMMARY OF THE INVENTION

Accordingly, it is an object of the present invention to provide an improved undergravel filter device.

Another object of the present invention is to provide an undergravel filter device which can be utilized for large sized or small sized aquarium tanks.

Still another object of the present invention is to provide an undergravel filter device having separable parts permitting use of the device for various sized aquarium tanks.

Another object of the present invention is to provide an undergravel filter device which provides for improved mixing of the air and water to thereby provide a more efficient filtering action of the decontaminated water from the aquarium tank.

Yet a further object of the present invention is to provide an undergravel filtering device including a separate mixing chamber for aiding in the mixture of the air and water, to increase the suction in the water compartment and provide better filtering.

Still another object of the present invention is to provide an undergravel aquarium aerating and filtering kit which is capable of compact assembly for packaging and storage.

Yet another object of the present invention is to provide for a compact undergravel filter device wherein the components are structured to integrate with each other, thereby providing a more compact assembly of the component parts.

Briefly, the invention describes an undergravel aquarium filter for an aquarium tank which includes a housing assembly adapted for positioning on the bottom of the tank floor beneath the gravel bed and defining therewith a water compartment. An inlet means is provided in the housing assembly through which water from the tank can flow into the water compartment. An enclosure extends upwardly from the housing assembly to provide a mixing chamber which is in fluid flow communication with the water compartment to thereby provide space for appropriate mixing of the air and the water. An outlet means is provided in the enclosure to permit the egress of air and water from the enclosure. An air stream supply means disposed in the enclosure directs air into the water compartment. In operation, water from the tank is caused to enter into the water compartment through the inlet means after passing through the gravel bed, and therefrom the water and air will egress through the outlet means.

In an embodiment of the invention, the housing assembly includes an inner section having a basewall and downwardly depending sidewalls, which define the main water compartment. A separable outer section surrounds the inner section and also has a basewall as well as downwardly depending inner and outer sidewalls, and defines therein a second water compartment. The inner section is supported in the outer section and fluid flow communication is provided between the main and second water compartments. Inlet means provides water from the tank into both the main and second water compartments. The inner and outer sections are separable, such that the outer section can be removed when using a small aquarium tank, and can be connected when using a larger sized aquarium tank.

In the embodiment of the invention, an air pump is provided, including a case supported by feet, and including on the case an air outlet pipe, and a line cord. Seats provided in the basewall of the inner section of the housing assembly can receive the feet of the air pump, whereby the air pump case can be supported on the basewall of the inner section. A groove provided in the sidewall of the inner section cooperates with the inner wall of the outer section to define a closed channel for accommodating passage therethrough of the line cord, which can then be stored in the main compartment in the inner section. An air hose is provided which can be coiled and stored in the second compartment. Various extension tubes for connection to the outlet means can be suitably accommodated between the enclosure and the air pump. The appropriate positioning of these components provides a compact assembly for facilitating storing or packaging of the undergravel filter device.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In various figures of the drawing, like reference characters designate like parts.

DESCRIPTION OF THE PREFERRED EMBODIMENT

Figure 1:
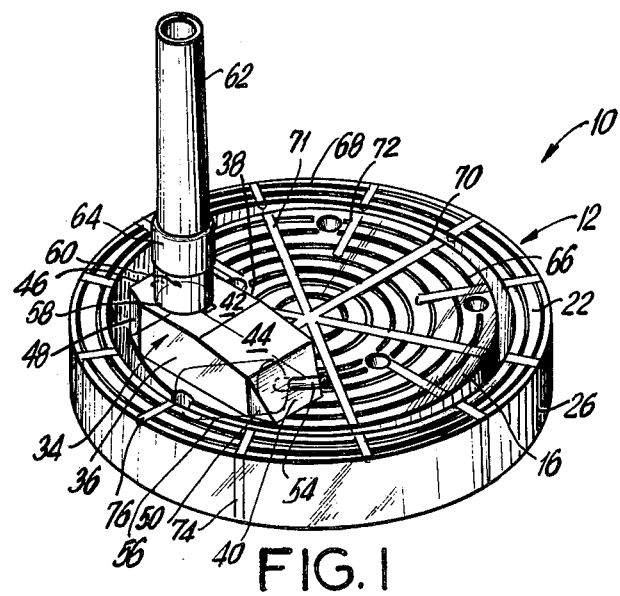
FIG. 1 is an isometric view of the undergravel filter device in accordance with the present invention.
Figure 2:
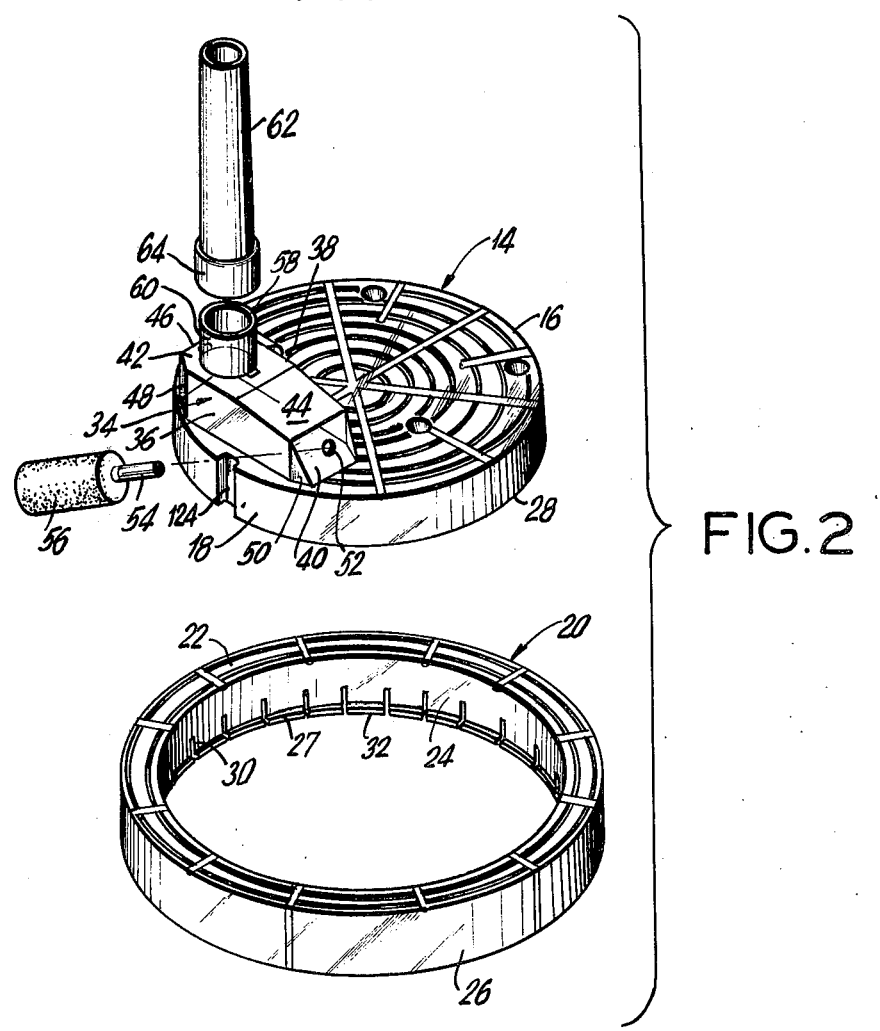
FIG. 2 is an exploded view of the components shown in FIG. 1.

Referring now to the drawings, and specifically to FIGS. 1 and 2, the device according to the invention comprises a filter shown generally by the reference numeral 10 and including a housing assembly 12 which can be positioned on the bottom of an aquarium tank beneath the gravel bed. The housing assembly includes an inner section 14 in the form of an inverted cup shaped housing having a basewall 16 and downwardly depending sidewalls 18 forming a main water compartment therebeneath. The housing assembly further includes an annular outer section 20 having a basewall 22 and a downwardly depending inner sidewall 24 and an outer sidewall 26, defining therebetween a secondary water compartment. The inner sidewall 24 is shorter than the outer sidewall 26 so that the secondary water compartment is in fluid flow communication with the main water compartment, as best shown in FIG. 4, as will be more fully described hereinafter below.

The inner and outer sections 14 and 20 are separable. An inwardly directed annular lip 27 is integrally formed from the bottom edge 32 of the inner sidewall 24 to retain the inner section 14 in supported relationship with the outer section 20 to thereby insure the fluid flow communication between the secondary and main water compartments. The basewall 16 of the inner section and the basewall 22 of the outer section are thus positioned in a substantially coextensive plane.

Figure 4:
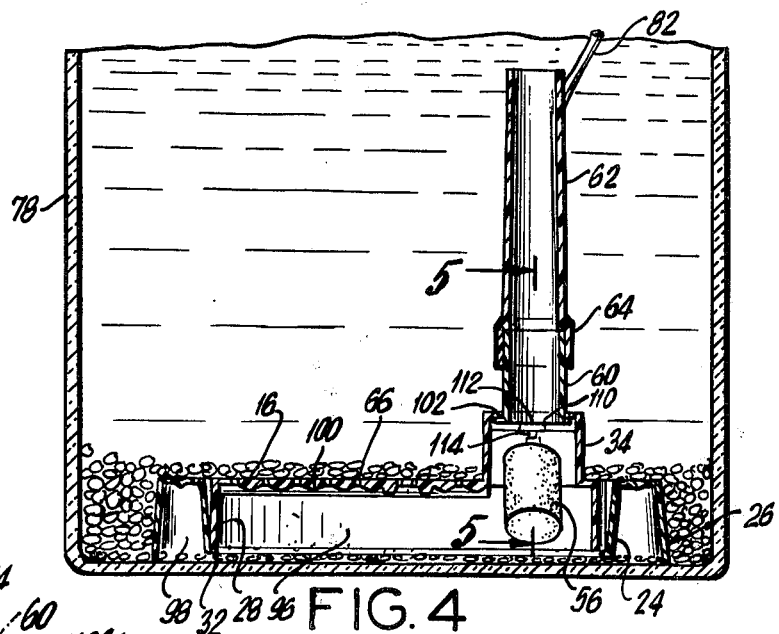
FIG. 4 is a sectional view taken along line 4—4 of FIG. 3.

The inner sidewall 24 of the outer section 20 is angled inwardly (as best seen in FIG. 4) to form a tight fit with the bottom edge 28 of the sidewall 18 of the inner section 14. Axial slots 30 formed from the lower edge 32 of the inner wall 24 and extending upwardly towards the basewall 22 are positioned around the periphery of the inner sidewall 24. These slots provide resilient finger-like gripping means to insure the above mentioned tight fit and allows the bottom edge 28 to be fully seated on the lip 27. Furthermore, the inner section can be easily separated from the outer section by applying upward pressure onto the inner section, where the slots allow release of the inner section, thereby permitting separation thereof.

Upwardly extending from the housing assembly, and specifically from the inner section 14, is an enclosure shown generally at 34, and comprising a substantially rectangular housing having opposing vertical walls 36, 38 with an angular forward wall 40 and including a top portion having a substantially flat section 42 and a truncated section 44. The rear of the enclosure 34 includes vertical section 46 with angled side sections 48. The triangular sections 50 interconnect the forward wall 40 with the sidewalls 36, 38. An inlet aperture 52 is formed in the angular forward wall 40 and receives a tubular stem 54 to which is coupled an air dispersing element 56, such as a porous stone, which disperses the air passing through the stem 54.

The enclosure 34 forms a mixing chamber therein which is in fluid flow communication with the main water compartment contained within the inner section 14. The stem 54 and porous stone 56 are supported by the inlet aperature 52 in an angular relationship with respect to the housing assembly, and extends through the mixing chamber and into the main water compartment, as best shown in FIGS. 4 and 5.

An outlet is provided in the enclosure 34 including an opening 58, in which is connected a tapered outlet pipe 60. A further tapered extension pipe 62, having a collar 64 at its lower end for connection to the pipe 60, is telescopically mounted onto the upper end of the outlet pipe 60.

Circumferential slots 66 are provided in the basewall 16 of the inner section and additional circumferential slots 68 are provided in the basewall 22 of the annular outer section 20. Radially oriented ribs 70 are provided and extend outwardly from the underside of the basewall of both the inner and outer sections which interrupt the circumferential slots and provide support and interconnection to the basewalls. In the inner section, some ribs 71 of the ribs 70 extend to the center of the inner section while other ribs 72 of the ribs 70 only extend part way along the basewall. Similarly, in the annular outer section, some ribs 74 of the ribs 70 extend radially and also continue axially downward along the outer sidewall 26, while other ribs 76 of the ribs 70 are only radially present along the basewall.

Figure 3:
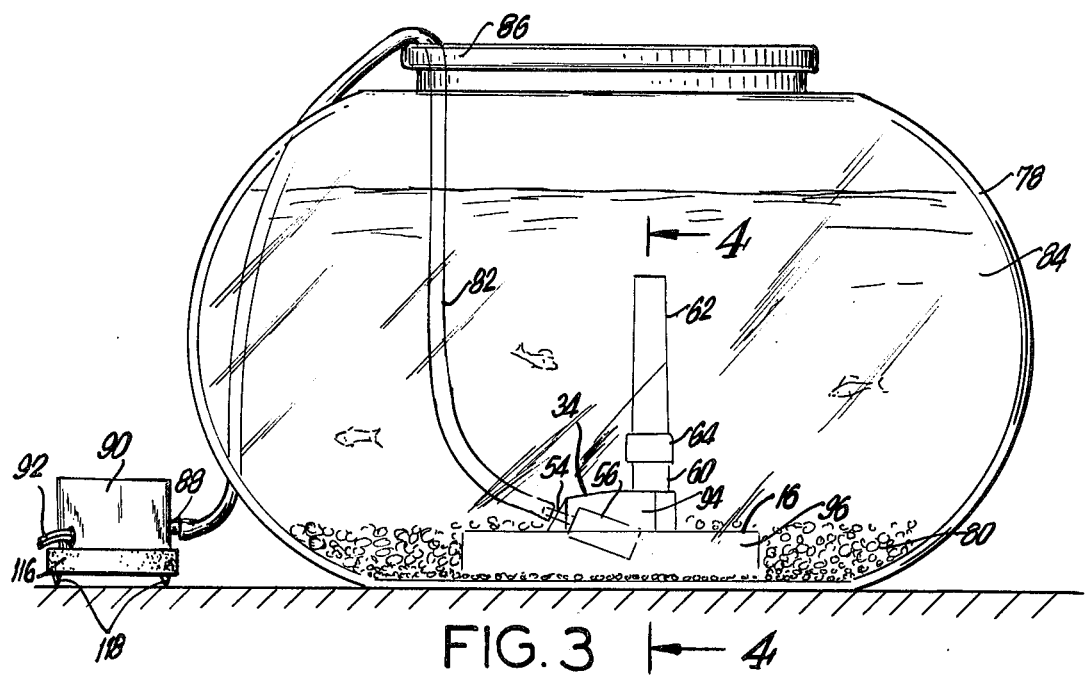
FIG. 3 is a side view of the undergravel filter in operation in an aquarium tank.
Figure 5:
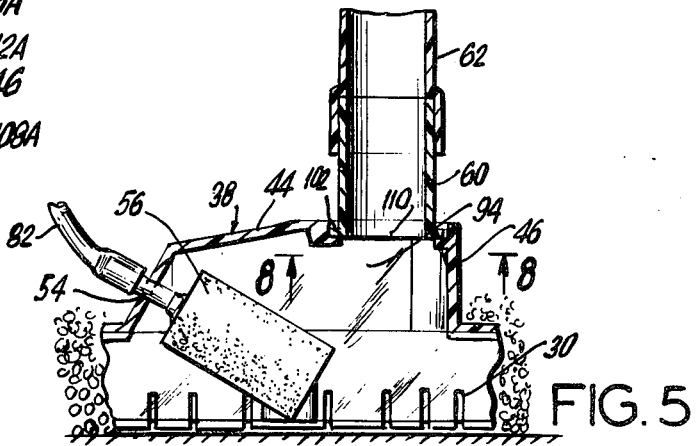
FIG. 5 is a fragmentary sectional view taken along line 5—5 of FIG. 4.

Referring now to FIGS. 3–5, the operation of the filter will be described. The filter is placed in an aquarium tank 78 beneath the gravel bed 80 such that at least part of the gravel is placed on top of the basewalls 16 and 22 of the housing assembly. The air dispersing element 56, supported by the stem 54, is placed in the enclosure 34. An air hose 82 is connected to the tubular stem 54. The air hose 82 passes through the water 84 over the neck 86 of the tank and connects to an outlet pipe 88 of an air pump 90 which is energized through an electrical line cord 92.

As air is pumped through the air hose 82 into the enclosure 34, the air is dispersed by the dispensing element 56 and the air passes through the mixing chamber 94 and into the water compartment 96, then the air leaves upwardly through the outlet pipe 60 and the extension pipe 62 to pass into the water. As the air passes upwardly, it causes the water fromthe water compartment 96 to also pass upwards through the mixing chamber 94, from where the water leaves through the outlet pipe 60 and extension pipe 62 together with the air. As a result, decontaminated water from the tank will be drawn or sucked into the water compartment through the slots 66, 68 in the basewalls. As the water travels into the water compartment 96, it passes through the gravel. The gravel therefore serves as the filter material trapping the waste material and separating same from the water. The decontaminated water will then be aerated and pass out from the filter back into the tank. The slots formed in the filter basewall are of a size which permits the water from the tank to pass into the water compartment, but are small enough to prevent the gravel from passing through.

One of the problems in prior art undergravel filter devices concerns the size of the filter. As is evident from FIG. 3, the filter housing assembly is rather shallow since it must fit under the gravel bed. Accordingly, the surface area of the filter is made as large as possible to provide a large surface for filtering the decontaminated water. However, a large filter area may be excessive for small sized tanks, where on the other hand, a small surface area filter will be too small for larger sized tanks. By utilizing the housing assembly of the present invention having both inner and outer sections, it is possible to use the combined sections for large sized tanks, as shown in FIG. 4, while separating the sections and discarding the outer section to use omly the inner section for smaller tanks, as shown in FIG. 3.

When utilizing the the two sections together, there is provided fluid flow communication between the main water compartment in the inner section and the secondary water compartment in the outer section. This fluid communication is achieved as set forth above by making the outer sidewall 26 of the outer housing higher than the inner sidewall 24 of the outer housing. The outer section will therefore sit on the peripheral edge of the outer wall which will then be in contact with the aquarium base, while the inner sidewall 24 will be slightly spaced from the bottom of the tank. Furthermore, since the inner sidewall 24 supports sidewall 28 of the inner section by means of the peripheral lip 27, the inner section will also be spaced from the bottom of the tank. As a result, there will be a space between the interconnecting walls of the inner and outer sections and the tank floor. This space will permit the flow of water between the main water compartment 96 and the outer secondary water compartment 98. As a result, decontaminated water drawn into the outer secondary compartment 98 will be able to flow into the main water compartment 96 and from there be drawn up into the mixing chamber 94 and through the outlet pipe 60 and extension pipe 62 back into the tank.

Another problem with existing undergravel filter devices concerns the appropriate efficiency of the filtering operation and the proper mixing of the air and water to provide aeration as well as filtration. By utilizing the enclosure 34 having its particular described structure to provide a mixing chamber 94, and by angularly disposing the porous air dispensing element 56 through the mixing chamber 94 and into the water compartment 96, an improved efficiency can result. The angular arrangement permits the air to be sent directly into the water compartment 96, thereby improving the aeration. By providing the mixing chamber 94, a greater amount of air activity and suction within the filter can be produced. Furthermore, the particular shape of the enclosure also provides improved results. By means of the truncated portion 44 as well as the tapered side portions 48 and 50, improved circulation of the air through the water is provided, and turbulence and internal resistance of the air and water mixture are reduced. This permits a greater efficiency and improved aeration, which causes a greater amount of decontaminated water to be drawn or sucked into the filter to be cleaned and aerated.

The inner section of the housing assembly can be molded as a single unitary construction formed together with the enclosure 34 and can be fabricated out of a clear plastic material. As is shown in FIG. 4, additional support for the basewall can be provided by forming additional ribs 100 on the undersurface of the basewall of a circular, saw-tooth shape, providing additional rigidity and strength to the basewall, thereby permitting it to withstand a greater amount of gravel and a greater height of water in the aquarium tank.

Figure 8:
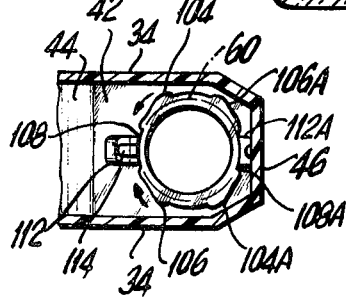
FIG. 8 is a fragmentary sectional view taken along line 8—8 of FIG. 5.

The outlet pipe or tube 60 is formed as a removable part from the enclosure 34 by means of a bi-directional locking mechanism, as can best be seen in FIGS. 4, 5 and 8. The lower end of the outlet pipe 60 contains an outwardly extending lip 102 with opposing pairs of cam surfaces 104, 104A and 106, 106A. Between the respective associated pairs there are opposing dwells 108, 108A. The cam surfaces each have a decreasing radius which tapers inwardly in the direction toward its respective dwell. Positioned at diametrically opposed positions on the wall around the opening 110 in the top of the enclosure 34 are shoulders 112, 112A spaced beneath the opening. The shoulders include support ribs 114, 114A for increased support.

The outlet pipe 60 is upwardly inserted from the mixing chamber 94 through the bottom of the opening 110, placing the dwells 108, 108A adjacent the shoulders 112, 112A, as shown in FIG. 8. The outlet pipe can then be rotated in either clockwise or counterclockwise direction, whereby the shoulders will engage against the underside of one pair of cam surfaces 104, 104A or 106, 106A in an overlapping arrangement. This mechanism provides a bi-directional lock between the outlet pipe 60 and the wall around the opening 110 in the enclosure 34. If desired, the extension pipe 62 could also include a cam surface formed on a flanged lip, so that the extension pipe could be directly interconnected to the enclosure 34 to provide some variety in the height of the outlet pipe to accommodate the height of water contained in an aquarium tank.

Figure 6:
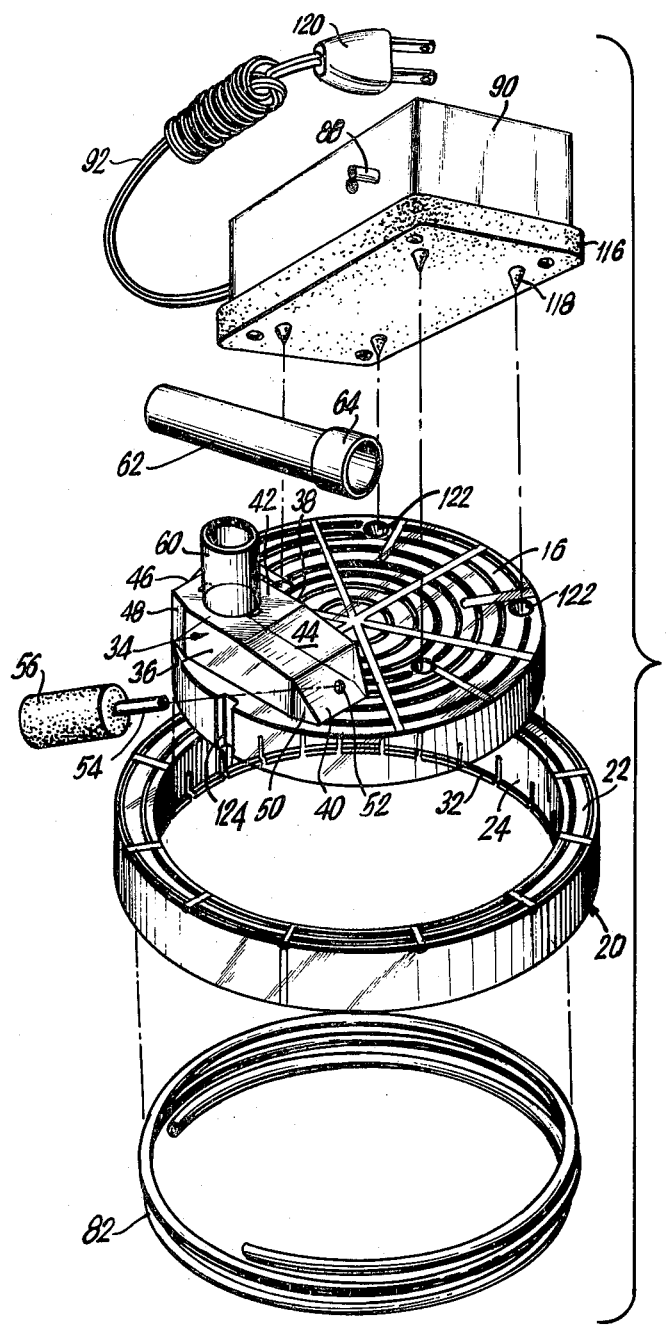
FIG. 6 is an exploded view of the components forming the aquarium aerating and filtering assembly in accordance with the present invention.
Figure 7:
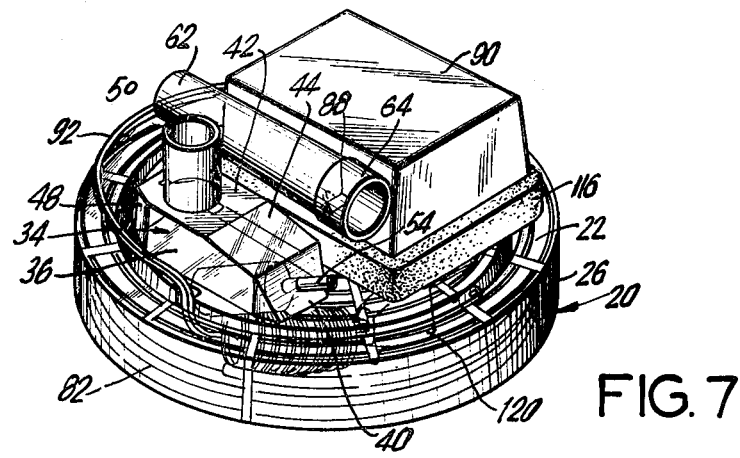
FIG. 7 is an assembled view of the components showing the compact nature of the aerating and filtering assembly.

One of the additional problems relating to undergravel filters is to provide appropriate storage and packaging of the component parts of the complete filter system. Because of the shallow nature of the filter housing itself, it becomes difficult to coordinate the various components to provide a compact assembly. Referring now to FIGS. 6 and 7, there is shown the individual components of a complete filter system of the present invention indicating the compact assembly provided thereby. The air filter 90 includes an upper case with a bottom resilient cover 116 having tapered feet 118 for supporting the pump. The line cord 92 is shown coiled and includes a utility plug 120 at its end.

Tapered bores 122 are formed into the surface of the basewall 16 of the inner section of the housing assembly to accommodate the tapered feet 118 of the air pump, permitting the air pump to be supported directly on the basewall 16.

A groove 124 is axially formed in the peripheral sidewall of the inner section and cooperates with the adjacent inner sidewall 24 of the outer section 20 to form a closed channel which can accommodate passage therethrough of the line cord 92 when the line cord is being stored within the main compartment formed beneath the inner section. The air hose 82 can be coiled and inserted within the secondary water compartment formed within the outer section of the housing assembly. The extension pipe or tube 62 can be retained between the enclosure 34 and the air pump 90, when the pump is seated on the basewall of the housing assembly, where the outlet pipe 60 is locked on the enclosure 34.

As shown in FIG. 7, all of the component parts of the aerating and filtering system of the present invention therefore are engageably related to form a compact assembly. The inner and outer sections of the housing assembly are interconnected with the outlet pipe locked in position on the enclosure. The air pump is supported directly on the basewall of the housing assembly with its feet inserted into the seats provided on the basewall. The line cord passes through the channel formed between the groove and the outer section, and is stored directly in the compartment formed beneath the inner section. The air hose is coiled and inserted in the annular compartment formed within the outer section. The extension pipe or tube is positioned between the air pump and the enclosure 34. The porous member 56 is inserted in place directly in the enclosure 34 with the tubular stem 54 being inserted in the inlet aperture. It will therefore be seen that a complete kit is provided in a compact manner containing all of the necessary components needed for a complete aerating and filtering system.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An undergravel aquarium filter for an aquarium tank having a gravel bed therein, said filter comprising, in combination, a housing assembly positionable on a bottom floor of the tank beneath the gravel bed for providing a water compartment, inlet means provided in said housing assembly through which water from the tank can flow into the water compartment, an enclosure extending upwardly from said housing assembly to provide therein a mixing chamber, said mixing chamber being in fluid flow communication with said water compartment, outlet means associated with said enclosure for permitting an egress of air and water from said mixing chamber, air stream supply means disposed in said enclosure for directing air into said water compartment to draw water from the tank into the waer compartment through said inlet means after passing through the gravel bed and for the egress of the air and water through said outlet means, said housing assembly including an inner section having a basewall and downwardly depending sidewalls to define therein a main water compartment, and a separable outer section surrounding said inner section and having a basewall and downwardly depending inner and outer sidewalls to define therein a secondary water compartment, an inwardly directed lip on said inner sidewall for supporting said sidewalls of said inner section to position the basewalls of said inner and outer sections in a substantially coextensive plane, said inlet means including aperture provided in the basewalls of said inner and outer sections, said inner sidewall of said outer section being shorter than said outer sidewall thereof, a lower peripheral edge of said outer sidewall being disposable on tank floor with said main and secondary water compartments being in fluid flow communication with each other.

2. An undergravel aquarium filter as in claim 1 and wherein said enclosure comprises a substantially rectangular housing, said air stream supply means including a tubular stem and an air permeable element coupled to said stem, said tubular stem being angularly supported with respect to said substantially rectangular housing and at least a part of said element extending into said main water compartment.

3. An undergravel aquarium filter as in claim 2 and wherein said enclosure includes a top portion having a flat section and a truncated section, said truncated section being positioned between sid flat section and an angular forward wall of said enclosure, said outlet means including an opening in said flat section and an outlet pipe upwardly extending from said opening.

4. An undergravel aquarium filter as in claim 3 and further comprising coupling means for removably coupling said outlet pipe to said enclosure at said opening.

5. An undergravel aquarium filter as in claim 4 and wherein said coupling means comprises opposing shoulders dipsosed beneath said opening, and bi-directional cam surfaced lips outwardly extending from a lower edge of said outlet pipe, said shoulders engaging an underside of said lips in an overlapping arrangement to provide a bi-directional locking device.

6. An undergravel aquarium filter as in claim 4 and further comprising a tapered extension pipe telescopically mountable onto said outlet pipe.

7. An undergravel aquarium filter as in claim 1 and wheein said apertures of said inlet means define slots for permitting the passage of water therethrough while preventing the passage of gravel therethrough.

8. An undergravel aquarium filter as in claim 1 and wherein said inner sidewall is angled inwardly to provide a tight fit between said inner and outer sections, and further comprising upwardly extending slots spaced about a periphery of said inner sidewall at a lower edge thereof for facilitating engagement and separation between said inner and outer sections.

9. An undergravel aquarium filter for an aquarium tank having a gravel bed therein, said filter comprising, in combination, a housing assembly positionable on a bottom floor of the tank beneath the gravel bed, said housing assembly including an inverted cup shaped inner section having a basewall and downwardly depending sidewalls for defining therein a main water compartment, and a separable outer section surrounding said inner section and having a basewall and downwardly depending inner and outer sidewalls for defining therein a secondary water compartment, supporting means for retaining said inner section within said outer section and for providing fluid flow communication between said main and secondary water compartments, inlet means provided in said housing assembly through which water from the tank can flow into said main and secondary water compartments, an enclosure extending upwardly from said housing assembly for providing therein a mixing chamber, said mixing chamber being in fluid flow relationship with said main water compartment, outlet means associated with said enclosure for permitting an egree of air and water therefrom, air stream supply means coupled to said enclosure for directing air into said mixing chamber and causing water from the tank to enter the water compartments through said inlet means after passing through the gravel bed and for the egress of the air and water through said outlet means, said inner sidewall being angled inwardly to provide a tight fit between said inner and outer sections, and upwardly extending slots spacially disposed about a periphery of said inner sidewall at a lower edge thereof for facilitating engagement and separation between said inner and outer sections.

10. An undergravel aquarium filer as in claim 9 and wherein said supporting means includes an inwardly directed lip on said inner sidewall of said outer section for supporting said sidewalls of said inner section.

11. An undergravel aquarium filter as in claim 10 and wherein said inner sidewall of said outer section and said sidewalls of said inner section are shorter than said outer sidewall thereof to position said basewalls of said inner and outer sections in a substantially coextensive plane, said housing assembly being disposable on a lower peripheral edge of said outer sidewall with said main and secondary water compartments being in fluid flow communication with each other.

12. An undergravel aquarium filter as in claim 9 and wherein said inlet means comprises slots provided in the basewall of said inner and outer sections, said slots permitting the passage of water therethrough while preventing the passage of gravel therethrough.

13. An undergravel aquarium filter as in claim 12 and wherein an undersurface of at least one of said basewalls is saw tooth in shape, said slots being disposed at a base of each tooth.

14. An undergravel aquarium filter as in claim 12 and wherein said inner section is circular in shape, said outer section is annular in shape, said slots are circumferential, and further comprising radial rips interrupting said slots for providing support to said basewalls.

* * * * *